United States Patent [19]

Kinley et al.

[11] 4,109,386

[45] Aug. 29, 1978

[54] SIGNAL-PRODUCING PIPE CALIPER

[75] Inventors: John C. Kinley, 5815 Royalton, Houston, Tex. 77027; Clifford E. Anderson; Charles W. Agee; Harry E. Dieckman, all of Houston, Tex.

[73] Assignee: John C. Kinley, Houston, Tex.

[21] Appl. No.: 581,897

[22] Filed: May 29, 1975

[51] Int. Cl.² .............................................. G01B 05/12
[52] U.S. Cl. .......................... 33/178 F; 33/DIG. 13
[58] Field of Search .......... 33/178 E, 178 F, DIG. 13

[56] References Cited

U.S. PATENT DOCUMENTS

| | | | |
|---|---|---|---|
| 1,905,200 | 4/1933 | Williams | 33/178 F |
| 2,607,128 | 8/1952 | Newhall | 33/178 E |
| 2,630,632 | 3/1953 | Brandon | 33/178 F |
| 2,656,613 | 10/1953 | Goble | 33/178 F |
| 2,786,276 | 3/1957 | Lusk | 33/178 F |
| 2,908,085 | 10/1959 | Price et al. | 33/178 F |
| 3,010,212 | 11/1961 | Kinley | 33/178 F |
| 3,898,741 | 8/1975 | Casey | 33/178 F |

*Primary Examiner*—Richard R. Stearns
*Attorney, Agent, or Firm*—Pravel, Wilson & Gambrell

[57] ABSTRACT

A new and improved signal-producing pipe caliper adapted to be moved through a section of pipe to detect internal variations in the inside surface of the pipe, and to transmit analog signals corresponding to such variations for suitable recording at a location which is remote from the caliper; such caliper having individual caliper feelers which are separately removable and replaceable without disturbing the electrical signal system, whereby replacement, including size changes of the caliper feelers for accommodating different inside diameters of the pipe being calipered, and/or repair may be accomplished in the field rather than requiring the return of the caliper to the shop.

9 Claims, 9 Drawing Figures

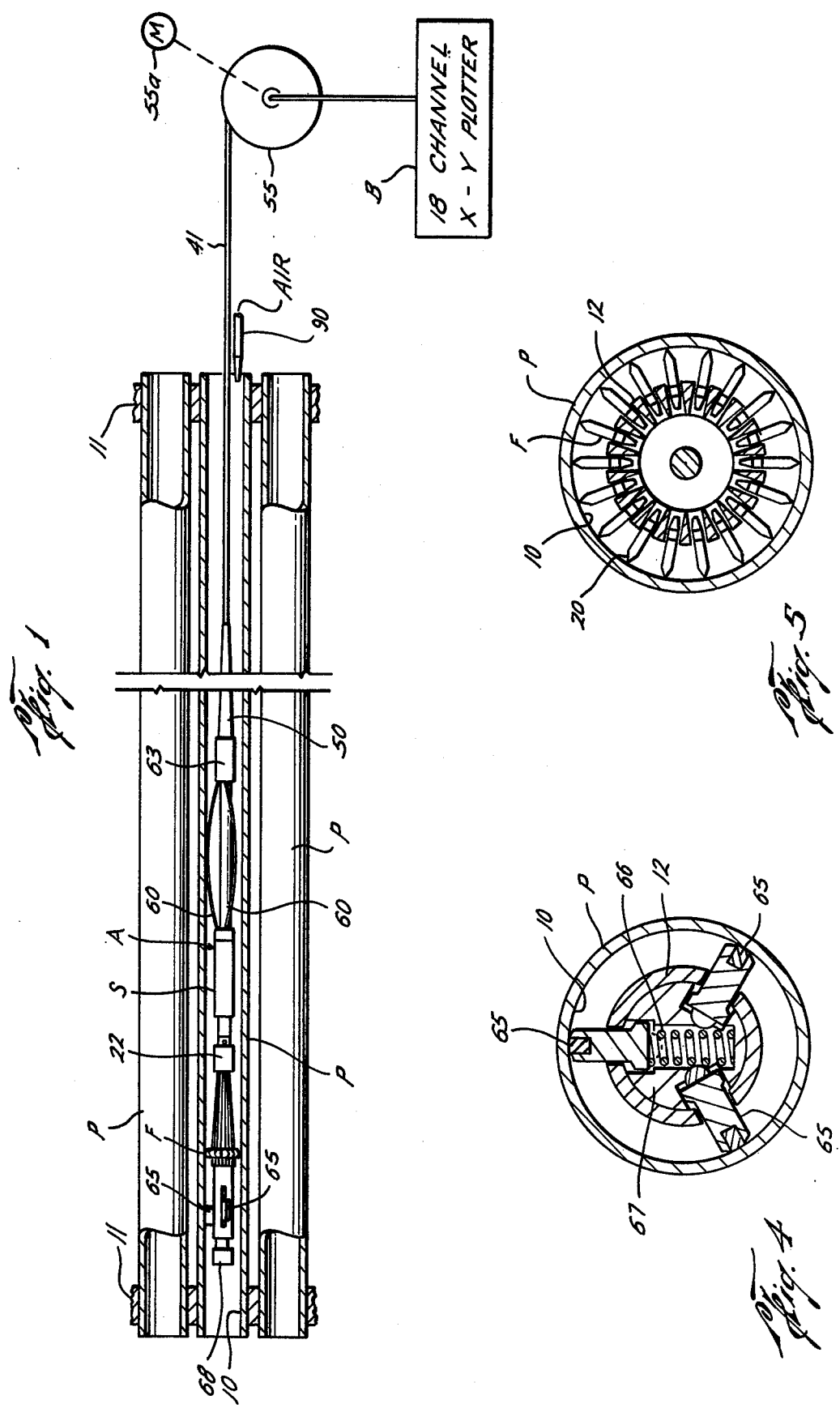

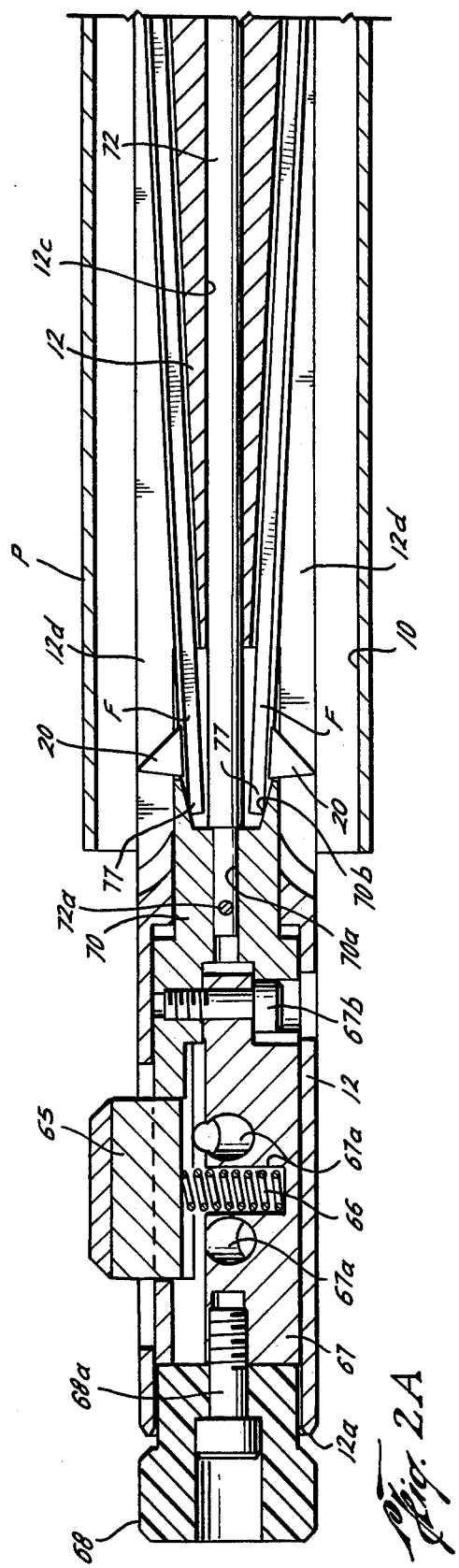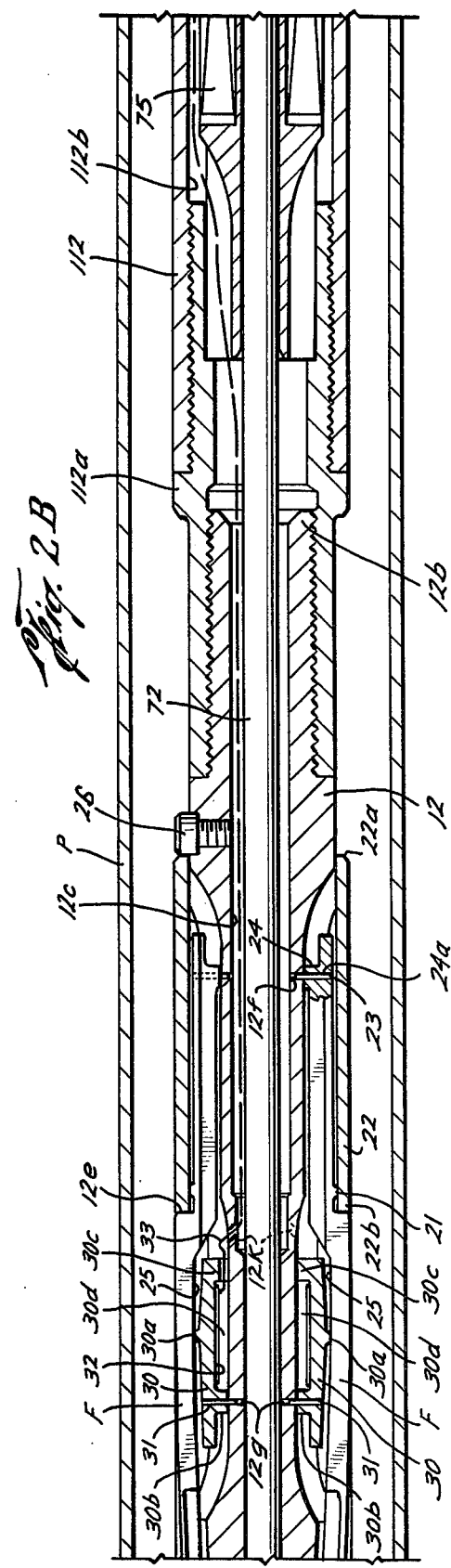

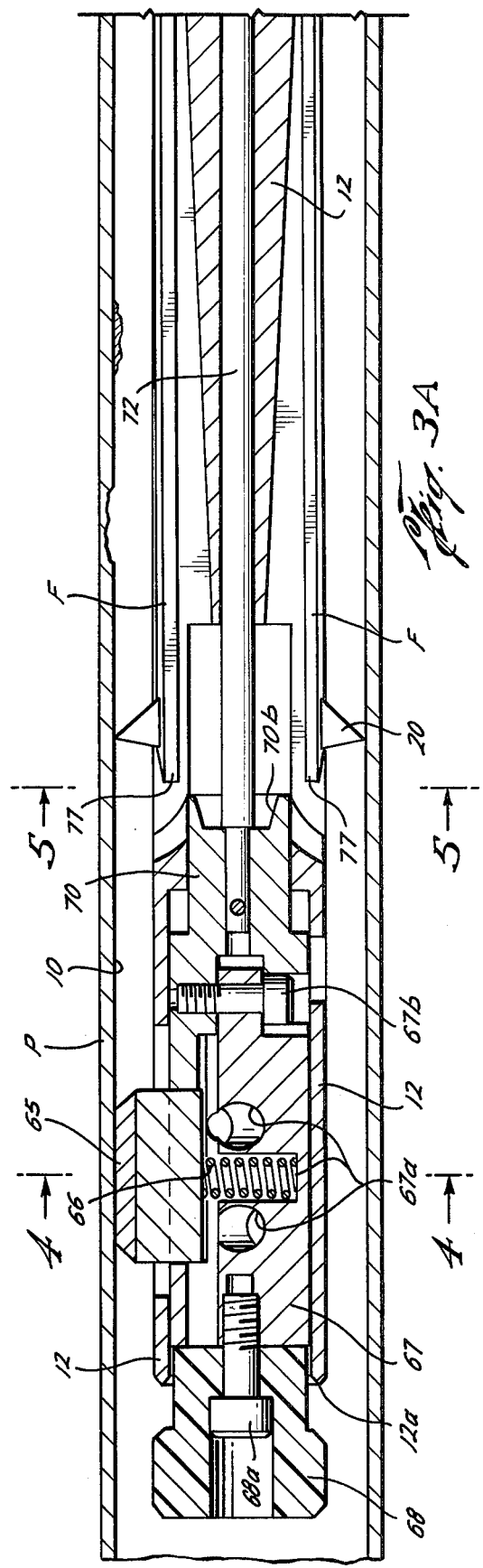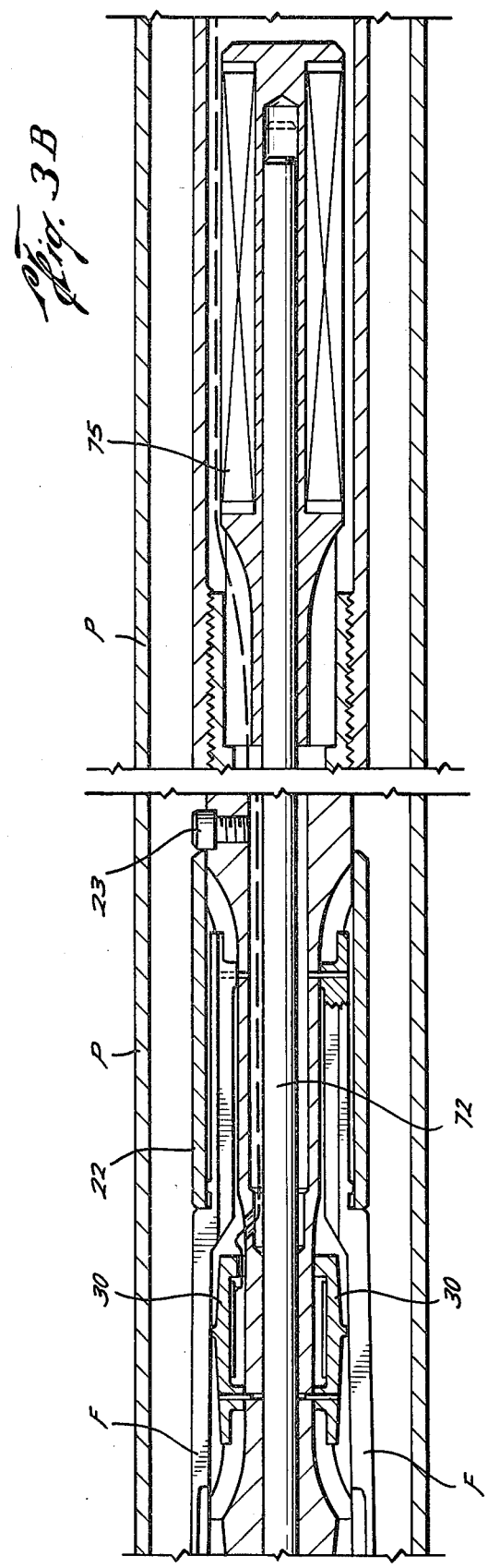

4,109,386

SIGNAL-PRODUCING PIPE CALIPER

BACKGROUND OF THE INVENTION

The field of this invention is calipers for detecting internal surface variations in pipes.

In U.S. Pat. No. 2,933,819, a pipe caliper is disclosed wherein a strain gauge is located on each feeler and the assembly is interconnected in such a manner that separate removal and replacement of individual feelers in the field would disturb the electrical system and therefore would be difficult, if not impossible, thereby usually necessitating the delay and expense of shop repair.

SUMMARY OF THE INVENTION

The present invention relates to a new and improved signal-producing pipe caliper, having an electrical signal system which is separately mounted from, but is actuated in response to, a plurality of caliper feelers mounted for engagement with the inside surface of a pipe, and in such a manner that the individual feelers may be separately removed from the caliper without disturbing the electrical signal system. Additional features include a unique centralizer assembly, a releasable latch means for the caliper feelers which is operated remotely from the caliper, and a terminal board connector for the signal wires which is disposed in the body of the caliper but is accessible for inspection, repair and/or replacement.

BRIEF DESCRIPTION OF THE DRAWINGS

FIG. 1 is an elevation of the apparatus of this invention, illustrating it in use in a tube of a multi-tube piece of equipment such as a heat exchanger, with the heat exchanger tubes being shown in part in vertical section;

FIGS. 2A, 2B, 2C and 2D are sectional views from the left-hand end of the pipe caliper of this invention to the right-hand end thereof, showing the caliper feelers in the latched position within a tube or pipe;

FIGS. 3A and 3B are views corresponding to FIGS. 2A-2D, with certain parts omitted, and illustrating the caliper feelers in the extended calipering position within a tube or pipe;

FIG. 4 is a cross-sectional view taken on line 4—4 of FIG. 3A; and

FIG. 5 is a cross-sectional view taken on line 5—5 of FIG. 3A.

DESCRIPTION OF THE PREFERRED EMBODIMENTS

Figure 2C:
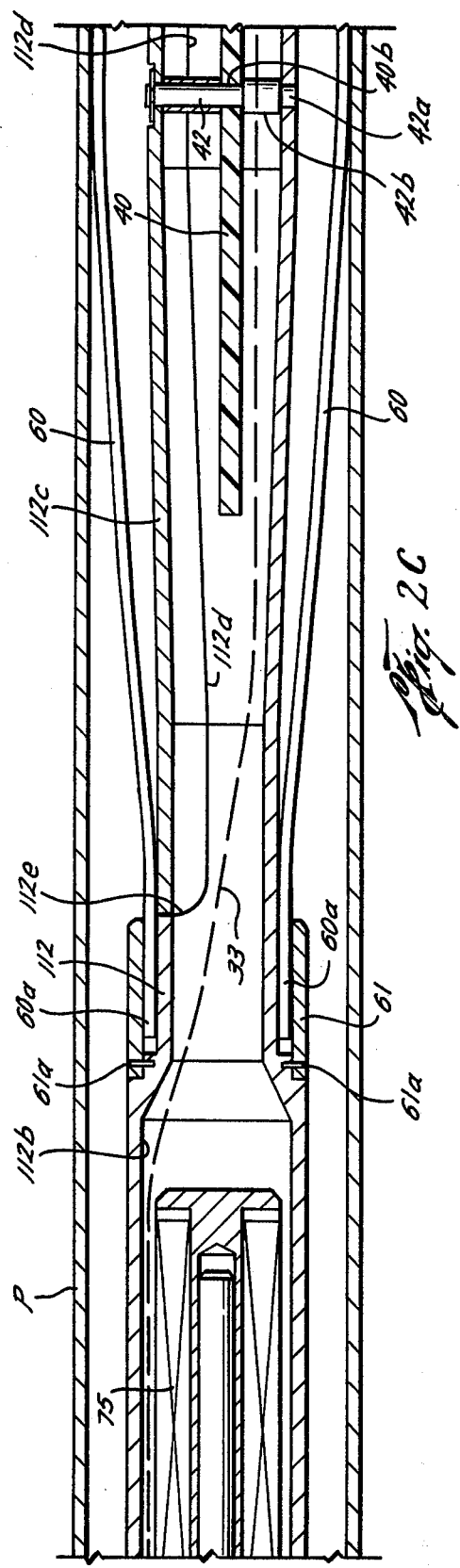

In the drawings, the letter A designates generally the caliper of this invention which is adapted to be positioned in a tube or pipe P for the purpose of contacting the inside surface 10 of such pipe P with a plurality of feelers F. The lateral or radial movements of such feelers F in response to surface variations on the inside surface 10 of the pipe P are transmitted to a signal-producing system S so that a signal or record can be produced at a location remote from the caliper A, such as at a conventional plotter B (FIG. 1). Typically, the caliper A is used for detecting corrosion pits or other defects in the interior of the pipe P, and particularly in a series of such pipes P disposed horizontally as illustrated in FIG. 1 in the usual arrangment for a heat exchanger or the like, wherein the tubes or pipes P are assembled in tube sheets 11 at each end thereof.

Considering the invention in more detail, the caliper A is shown in the running-in or inactive position in FIGS. 2A-2D, with the feelers F in the retracted position.

The caliper A has a longitudinally extending body 12 which extends from its left-hand end 12a (FIG. 2A) to its right-hand end 12b (FIG. 2B). Such body 12 has a longitudinal central opening or bore 12c which extends for substantially the full length of the body 12, but which is enlarged at its left-hand portion as illustrated in FIG. 2A. The body 12 also has a plurality of longitudinal slots 12d in its external surface, which are circumferentially spaced and extend radially for receiving each of the feelers F and for permitting lateral or radial movement thereof, as will be more fully explained hereinafter.

Figure 2D:
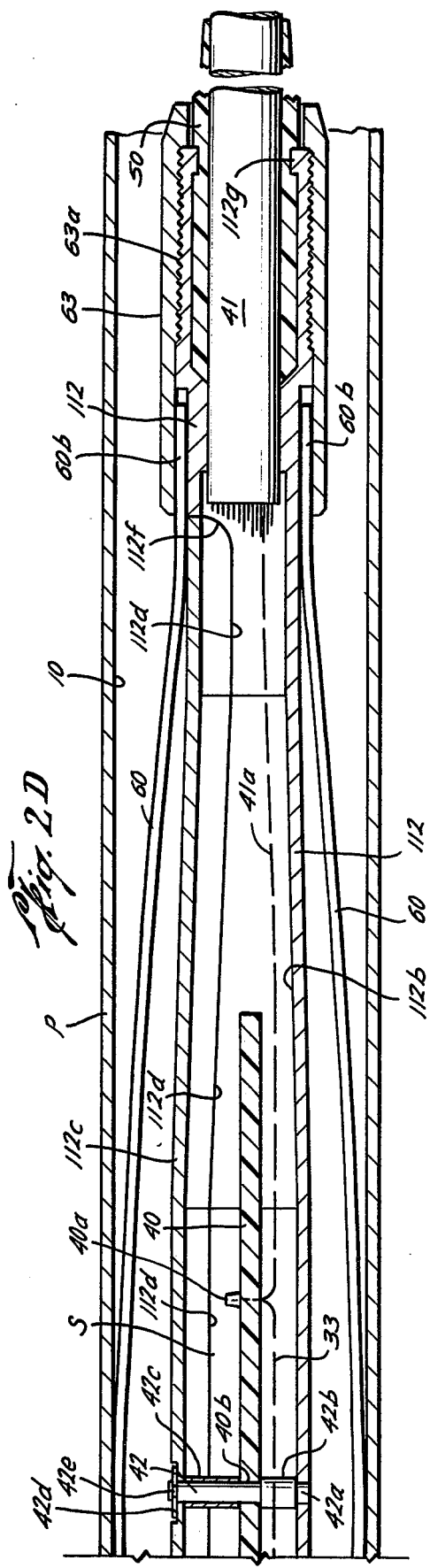

The body 12 has a body extension 112 which may be considered a part of the body 12, and in some instances it could even be made in a single piece with the body 12. The interconnection between the body 12 and the body extension 112 is preferably made by a threaded adaptor 112a (FIG. 2B), although any other suitable connection may be provided. The body extension 112 preferably extends to the right-hand end of the caliper A (FIG. 2D) and it includes a central longitudinal area 112b which houses the bulk of the signal-producing system S (FIGS. 2B-2D).

Each of the feelers F is an independent separate member from the other feelers F and the rest of the structure of the caliper A. Each feeler F is separately mounted on the body 12, with each feeler F being in a separate one of the slots 12d, as best seen in FIG. 5. The number of such feelers F may vary, but in the preferred form of the invention illustrated in the drawings, there are eighteen of such feelers so that as much of the inside surface 10 of the pipe P is contacted as possible by the feelers F. Each feeler F has a contact member 20 which is preferably a carbide tooth or tip which is soldered to the main part of the feeler, whereby such teeth or tips 20 may be readily repaired and/or replaced either in the shop or in the field. As will be explained in detail hereinafter, when the feelers F are in the released or unlatched position, the teeth or tips 20 of the feelers are adapted to engage and ride on the inside surface 10 of the pipe P so as to move laterally in response to variations in such surface, with each feeler F moving independently of the other feelers F and transmitting such variations to the signal-producing system S.

Each feeler F is provided with a first bearing projection 21 which is on the outside of each feeler F for engagement with a retaining sleeve 22 which is mounted slidably on the body 12 and which is releasably positioned thereon by one or more releasable set screws 26 extending into the body 12 and engaging a portion 22a of the sleeve 22 so as to confine the other end 22b of the sleeve 22 against a shoulder 12e on the body 12 (FIG. 2B).

Each feeler F is releasably mounted near its right hand end (FIG. 2B) to the body 12 by a removable pin 23 which extends through an opening 24a in an inwardly extending contact portion 24 of each feeler F which is in engagement with the body 12. The opening 24a is in alignment with an opening 12f in the body 12 for each feeler F so as to receive the releasable mounting pin 23. Thus, each feeler F is confined longitudinally with respect to the body 12 by one of the pins 23 and by the engagement of the releasable sleeve 22 at the shoulder 12e, as previously explained.

Further, each feeler F has an inner surface 25 near its mid-portion (FIG. 2B) and to the left of the first bearing projection 21 which is engaged by a bearing projection 30a on a bridge member 30. A separate bridge member 30 is preferably provided for each of the feelers F, and each such bridge member 30 extends longitudinally and is provided with base contact portions 30b and 30c. The contact portion 30b is provided with a lateral opening therethrough, which is in alignment with an opening 12g in the body 12 for receiving a releasable retaining pin 31, whereby the bridge member 30 is retained on the body 12 and is prevented from moving longitudinally relative thereto so long as the feeler F is positioned on the body 12 with its retaining pin 23 and sleeve 22. However, upon a release of each feeler F from the body 12, the bridge members 30 adjacent each release feeler F may also be removed readily from the body 12 by removing pin 31 therewith.

It should be noted that there is a cavity 30d between the contact portions 30b and 30c, which is utilized for mounting a strain gauge 32 or similar sensor device. Such strain gauge is of conventional construction and is adapted to produce a variable electrical resistance in response to variations in the strain physically imparted thereto by the flexing of the bridge member 30 therewith, which in turn is responsive to the flexing of each feeler F engaging with each such bridge member 30. In this connection, it should be noted that the first bearing projection 21 and the second bearing projection 30a remain in contact with their respective surfaces at all times during use, and serve as fulcrum points, as the portion of each feeler F to the left of projection 30a moves laterally in response to surface variations encountered by the feeler tooth or tip 20, as will be more evident hereinafter.

Each strain gauge 32 is connected electrically in the signal-producing system S by suitable electric wires indicated at 33, which preferably extend through a suitable longitudinally extending hole or opening in the contact portion 30c for each of the bridge members 30. The wires 33 are passed through suitable openings 12k in the body 12 and they then extend longitudinally through the bore 12c in the right-hand direction as viewed in FIGS. 2B-2D and they terminate at a terminal board 40 which is preferably made of an epoxy material or similar plastic, and which may have a printed circuit thereon, or other similar electrical connector system. For the purposes of illustration, the terminal board 40 is shown as having one terminal 40a for connecting one of the wires 33 to one wire 41a extending from a cable 41 which is mounted, as will be explained in detail, near the right-hand end of the caliper A of this invention. It should be understood that each strain gauge 32 has a wire or wires 33 leading therefrom and terminating at the terminal board 40 in a termination connection 40a to one of the wires 41a from the main cable 41, but only one is illustrated in FIG. 2D. The number of such wires will therefore depend upon the number of strain gauges employed and also the corresponding number of feelers F employed in the caliper A.

Although other means of connecting the strain gauges 32 into the channel plotter B (FIG. 1) may be employed, the preferred form of the invention is illustrated in FIGS. 2C and 2D wherein the terminal board 40 is disposed in the body extension 112 and is preferably located so as to be readily accessible in the field or other location in the event repairs or inspection of the terminal board 40 and the corresponding electrical system of the signal-producing system S is desired or necessary. Thus, the terminal board 40 is provided with two or more openings 40b for receiving terminal posts 42, which are secured at their ends 42a to the body extension 112 by welding, bonding or any other suitable means. A spacer sleeve 42b is disposed between the body extension 112 and the terminal board 40 on each post 42 for spacing the terminal board 40 in approximately the central portion of the internal area within the body extension 112. A removable section 112c is provided in the body extension 112 to serve as a cover or removable door so as to provide such access to the interior of the body extension 112. Each post 42 has a spacer sleeve 42c positioned thereon for confining the terminal board 40 against relative movement, and each post 42 extends through a suitable opening in the cover or door 112c. The door 112c is retained in position by means of a snap washer or ring 42d on the outside of each post 42, fitting in a suitable groove 42e in each of such posts 42. Thus, by simply removing the split snap washers 42d, or other suitable retaining device equivalent thereto, the cover or door 112c may be removed to provide a large enough opening for removing the printed circuit board or terminal board 40 from the posts 42 for inspection and/or repair. The door or cover 112c may likewise be easily returned to the assembled position shown in FIGS. 2C and 2D by returning the split snap rings 42d to the posts 42 so as to thus hold the cover 112c and likewise the terminal board 40 in a stable position within the body extension 112. Although the cover or door 112c may have different shapes or configurations, the form illustrated in FIGS. 2C and 2D is defined by the lower edge 112d which curves up at the ends 112e and 112f.

The cable 41 is secured to the body extension 112, preferably in the manner illustrated in FIG. 2D, wherein a molded epoxy sleeve 50 is disposed over the sheath of the cable 41 so as to provide some flexibility for the cable 41 as it extends from the caliper A, while preventing the cable from bending sharply at such points. The epoxy or other suitable retaining material forming the sleeve 50 is preferably molded in place so as to fit over the retaining shoulder 112g on the body extension 112 to prevent longitudinal relative movement therebetween, and thus to also confine the cable 41 with respect to the body extension 112.

As previously noted, the cable 41 extends longitudinally within the tube or pipe P which is being calipered and it may be wound and unwound on a reel or winch 55 (FIG. 1), using any conventional equipment.

For centralizing the caliper A within the interior of the pipe P, a plurality of resilient bowed centralizer springs 60, formed of steel or other suitable resilient material are mounted on the body extension 112. Preferably there are three of such springs 60, although the number may vary. The left-hand end 60a of each spring 60 is disposed and confined within a retaining sleeve 61, which is connected to the body extension 112 by suitable pins or other retaining means 61a. The ends 60a of the centralizer members 60 are free to slide longitudinally within limits between the body extension 112 and the sleeve 61 so that such centralizer members 60 may move longitudinally at their ends when they are compressed and extended laterally due to variations in the inside surface of the pipe P and for accommodating to different inside diameters of the pipes P, whereby constant engagement with the inside surface of the pipe is maintained at all times by such centralizer springs or members 60.

The right-hand end 60b of each centralizer spring 60 is similarly mounted for longitudinal movement and is confined laterally by a removable sleeve 63 (FIG. 2D) which is threaded or is otherwise mounted on the body extension 112 at threads 63a. When it is desired to remove the centralizer springs 60, the sleeve 63 may be unthreaded so that it moves to the right as viewed in FIG. 2D, thereby exposing the ends 60b and enabling the other ends 60a to be removed from the sleeve 61.

At the left-hand end of the caliper A (FIG. 2A), the tool is maintained in a centralized position by a plurality of centralizer shoes 65, preferably three in number which are helically disposed so as to be longitudinally offset with respect to each other, and each of which is urged radially outwardly by a spring 66. Each spring 66 fits within a suitable recess 67a in a centralizer support block 67 formed of brass or other suitable material, and which is slidable within the body 12 at the left-hand end, as will be more evident hereinafter. The center of each recess 67a is in alignment with the center of each shoe 65. For clarity, the openings 67a for the other two springs 66 and thus for the other two centralizer shoes 65 have been shown in the support block 67, but the springs 66 and the shoes 65 therewith have been omitted (FIG. 2A).

A bumper 68 formed of rubber or resilient plastic is secured to the support block 67 by any suitable means such as a bolt 68a. The centralizer support block 67 is secured to a latch head or receptacle 70 by means of a bolt 67b or other suitable securing means.

The latch receptacle 70 has a longitudinal bore 70a for receiving the left-hand end of a latch actuator rod 72 which is secured thereto by any suitable securing means such as screw or pin 72a.

The latch operating rod 72 extends into a solenoid 75 which is electrically connected through one or more electrical wires (not shown) leading to the terminal board 40 and then to the cable 41 for connection at a remote location to a source of electrical energy for energizing and de-energizing the solenoid 75, as desired, for controlling the latching and unlatching of the feelers F, as will be more fully explained.

When the solenoid 75 is actuated, it pulls the rod 72 to the right as viewed in FIGS. 2A–2C and such action pulls the latch head or receptacle 70 to the right. The latch head or receptacle has a latch cavity 70d within which the left-hand ends 77 of each of the feelers F extends to hold the feelers F in the retracted position (FIG. 2A). When the solenoid 75 is de-energized, the rod 72 may then move to the left so that the latch head or receptacle 70 may likewise move to the left relative to the body 12 and the feelers F, thereby releasing the feelers F so that they may move out radially or laterally by their inherent resiliency until the tips or teeth 20 or laterally by their inherent resisliency until the tips or teeth 20 of the feelers F engage the inside surface 10 of the pipe P (FIGS. 3A and 3B).

Such relative movement of the latch head or receptacle 70 for releasing the feelers F is obtained, after de-energizing the solenoid 75, by pulling the caliper A to the right with the cable 41, which causes the centralizer shoes 65 to drag on the inside surface 10 of the pipe P and thus produce the movement of the body 12 to the right relative to the latch head or receptacle 70 which remains in a relatively fixed position. It is to be noted that the latch head 70, the centralizer block or support 67 and the bumper 68 are all connected together so that their position is determined by the drag on the centralizer shoes 65 during such release of the feelers F.

OPERATION

In the use or operation of the caliper A of this invention, the caliper A is assembled outside of the pipes or tubes in which it is to be used, by manually or otherwise holding all of the feelers F in the retracted position of FIG. 2A and then energizing the solenoid 75 to cause the solenoid rod 72 to move to the right and head or receptacle 70. The caliper A is then in the latched or inactive position and is ready to be positioned within one of the pipes or tubes P. When the pipes or tubes P are positioned vertically, the caliper A is simply lowered by its own weight due to gravity to the point at which the calipering is to begin. If the tubes or pipes P are disposed horizontally, the caliper A is positioned in the right-hand end of one of the tubes or pipes P as viewed in FIG. 1 and is then preferably forced to the left by air as indicated at 90, with the feelers F retracted and out of engagement with the inside surface of the pipe P. Where the tube is open on both ends, the caliper may be pulled to the left-hand end of the pipe P by connecting a lead wire or line to the left-hand end of the caliper A, or by using any other suitable means. During the positioning of the caliper A at its lowermost position or its left-hand position for beginning the calipering operation, it will be understood that the reel or winch 55 is operated to permit the cable 41 to pay out, and for that purpose, any suitable mechanism such as the motor 55a may be utilized.

When it is desired to begin the calipering operation, the solenoid 75 is de-energized so that the solenoid or operating rod 72 is no longer retained in its right-hand position within the solenoid 75 by the solenoid action. Thereafter, when the cable 41 is pulled upwardly or to the right as viewed in FIG. 1, the drag shoes 65 resist such movement and thus the latch head 75 is held relative to the body or housing 12 so that the feelers F move to the right or upwardly relative to the latch head or receptacle 70, thereby moving the feeler ends 71 out of the cup portion 70b and permitting the resilient feelers F to move laterally or radially outwardly until the teeth or tips 20 engage the inside surface 10 of the pipe P.

The reel 55 is operated to wind the cable 41 thereon, and such cable is connected electrically to the channel plotter B or other suitable recording equipment, preferably making a single trace for each of the feelers F in any known or desired manner.

During such travel of the caliper A to the right or upwardly within the pipe or tube P being calipered the lateral or radial movements of each of the feelers F at the teeth or tips 20 are transmitted through the length of each feeler F so as to produce a flexing of the bridge member 30 with each feeler F in response to the particular variations in the movements of each particular feeler F. Such fluctuations in each feeler F produce variations in the strain on each strain gauge 32 or other sensor means disposed with the bridge member 30, thereby transmitting an analog signal or signal which is responsive to and substantially proportional to such feeler movements. Each such signal is transmitted through the wires connected to the strain gauges and the cable 41 to the surface or other remote location where the channel plotter B is located. Thus, a continuous record for the full length of travel of the caliper A within the pipe P is obtained for each of the feelers F. Pits, holes, or other surface irregularities on the inside 10 of the pipe P will be detected by the lateral movements of the feelers which will produce a corresponding variations in the signals at the system S. The signals thus result in a record, at the channel plotter B or other suitable recording equipment, of a line for each feeler F.

As previously explained, in the event it becomes necessary or desirable to remove a feeler F for replacement for any purpose such as providing feelers F of different dimensions to accommodate pipes or different inside diameters, or for repair, this may be readily done in the field or in the shop, without any special equipment and without disturbing the signal-producing system S. Likewise, full access is available to the electrical terminals at the terminal board 40 of the signal-producing system, so that repairs and/or replacements may be made in the field or in the shop with respect to that portion of the caliper A. It will be understood that repeated runs with the caliper A may be run by simply resetting the feelers F in the latched position and then placing the caliper A for the beginning of each run within each desired section or portion of the pipe or tube P.

It is to be noted that the helical arrangement of the shoes 65 makes it possible to provide each spring 66 of greater length than would be possible if the shoes 65 were centrally aligned on the same radial plane, and that provides for the effective gripping action of the shoes 65 to release the latch head 70, as previously explained. Also, the shoes 65 are located in close proximity to the feeler tips 20 to assure centralization of the tool at such area of feeler contact for thereby assuring a more accurate response by such feeler tips 20 to the surface variations inside the pipe P.

The foregoing disclosure and description of the invention are illustrative and explanatory thereof, and various changes in the size, shape and materials as well as in the details of the illustrated construction may be made without departing from the spirit of the invention.

We claim:

1. A signal producing pipe caliper, comprising:
  a longitudinal body;
  a plurality of caliper feelers releasably mounted on said body for lateral movement relative thereto;
  a signal producing system for producing signals responsive to movement of each of said feelers;
  said signal producing system having a movement transmitting means operatively engaged by said caliper feelers and responsive to lateral movements of said feelers;
  means for mounting the signal producing system with said body;
  means for releasably mounting each of said feelers on said body separately from said signal producing system mounting means for permitting removal of each said feeler and replacement with another feeler without disconnecting said signal producing system from said body;
  said body has a plurality of longitudinal slots therein, one for each said feeler; and
  said feeler mounting means includes a longitudinally slidable sleeve releasably secured with the body which normally extends over a portion of each said feeler and confines same in predetermined longitudinal and radial locations on said body.

2. The structure set forth in claim 1, including:
  a movement transmitting member mounted on said body for each feeler and engaged by each feeler.

3. The structure set forth in claim 2, including:
  a first bearing projection on each feeler engageable with the interior surface of said sleeve; and
  a second bearing projection on each feeler engageable with said movement transmitting member;
  said first and second bearing projections on each said feeler serving as fulcrum points for the transmittal of said lateral movements of said feelers to said movement transmitting member.

4. The structure set forth in claim 3, said signal producing system including:
  a sensor on each said movement transmitting member for sensing said lateral movements of each of said feelers.

5. A signal producing pipe caliper, comprising:
  a longitudinal body;
  a plurality of caliper feelers releasably mounted on said body for lateral movement relative thereto;
  a signal producing system for producing signals responsive to movement of each of said feelers;
  said signal producing system having a movement transmitting means operatively engaged by said caliper feelers and responsive to lateral movements of said feelers;
  means for mounting the signal producing system with said body;
  means for releasably mounting each of said feelers on said body separately from said signal producing system mounting means for permitting removal of each said feeler and replacement with another feeler without disconnecting said signal producing system from said body;
  latch means for releasably locking said feelers in a retracted position radially inwardly with respect to said longitudinal body;
  latch release means for releasing said latch means while said caliper is in the pipe to be calipered;
  a latch receptacle for receiving a portion of each of said feelers; and
  a solenoid actuated rod operably connected to said receptacle and remotely operated to inactivate said latch means.

6. The structure set forth in claim 5, wherein said latch release means includes:
  centralizer shoes mounted with said body for resilient engagement with the inside of the pipe to be calipered, and with each shoe being offset longitudinally with respect to the other shoes.

7. The structure set forth in claim 6, wherein:
  said centralizer shoes are at least three in number which are arranged helically and extend outwardly relative to said body in close longitudinal proximity to said caliper feelers.

8. A signal producing pipe caliper, comprising:
  a longitudinal body;
  a plurality of caliper feelers releasably mounted on said body for lateral movement relative thereto;
  a signal producing system for producing signals responsive to movement of each of said feelers;
  said signal producing system having a movement transmitting means operatively engaged by said caliper feelers and responsive to lateral movement of said feelers;
  means for mounting the signal producing system with said body;
  means for releasably mounting each of said feelers on said body separately from said signal producing system mounting means for permitting removal of each said feeler and replacement with another feeler without disconnecting said signal producing system from said body;

latch means for releasably locking said feelers in a retracted position radially inwardly with respect to said longitudinal body;

latch release means for releasing said latch means while said caliper is in the pipe to be calipered; and centralizer shoes mounted with said body for resilient engagement with the inside of the pipe to be calipered, and with each shoe being offset longitudinally with respect to the other shoes.

9. The structure set forth in claim 8, wherein:

said centralizer shoes are at least three in number which are arranged helically and extend outwardly relative to said body in close longitudinal proximity to said caliper feelers.

* * * * *